United States Patent
Endo et al.

(10) Patent No.: US 10,783,425 B2
(45) Date of Patent: Sep. 22, 2020

(54) SEMICONDUCTOR STORAGE DEVICE

(71) Applicant: Toshiba Memory Corporation, Tokyo (JP)

(72) Inventors: Shigeto Endo, Yokohama Kanagawa (JP); Keisuke Sato, Yokohama Kanagawa (JP)

(73) Assignee: Toshiba Memory Corporation, Tokyo (JP)

( * ) Notice: Subject to any disclaimer, the term of this patent is extended or adjusted under 35 U.S.C. 154(b) by 0 days.

(21) Appl. No.: 16/290,618

(22) Filed: Mar. 1, 2019

(65) Prior Publication Data

US 2020/0065643 A1 Feb. 27, 2020

(30) Foreign Application Priority Data

Aug. 27, 2018 (JP) .................................. 2018-158524

(51) Int. Cl.
*G06K 19/06* (2006.01)
*G06K 19/077* (2006.01)

(52) U.S. Cl.
CPC .............................. *G06K 19/07769* (2013.01)

(58) Field of Classification Search
CPC ......... G06K 19/07749; G06K 19/0723; G06K 19/07743
USPC ....................................................... 235/492
See application file for complete search history.

(56) References Cited

U.S. PATENT DOCUMENTS

| 4,795,898 A * | 1/1989 | Bernstein ........... G06K 7/10326 |
| | | 235/487 |
| 6,998,688 B2 * | 2/2006 | De Jongh ........ G06K 19/07372 |
| | | 235/449 |
| 8,325,002 B2 | 12/2012 | Lim et al. |
| 2016/0020517 A1 | 1/2016 | Florek et al. |
| 2016/0275393 A1 | 9/2016 | Jain et al. |
| 2017/0068631 A1 | 3/2017 | Endo |

FOREIGN PATENT DOCUMENTS

JP 2013182481 A 9/2013

* cited by examiner

*Primary Examiner* — Jamara A Franklin
(74) *Attorney, Agent, or Firm* — Kim & Stewart LLP

(57) ABSTRACT

A semiconductor storage device includes a substrate having a first surface, a loop antenna, and a magnetic substance. The loop antenna includes first, second, third, and fourth electrodes, first and second inner wirings, and first and second outer wirings, the first outer wiring having a first end connected to the first electrode and a second end connected to the second electrode, the first inner wiring having a first end connected to the second electrode and a second end connected to the third electrode, the second outer wiring having a first end connected to the third electrode and a second end connected to the fourth electrode, and the second inner wiring having a first end connected to the fourth electrode and a second end connected to another electrode. The magnetic substance is on the first surface and surrounded by the first and second inner and outer wirings.

20 Claims, 13 Drawing Sheets

SEMICONDUCTOR STORAGE DEVICE

CROSS-REFERENCE TO RELATED APPLICATION

This application is based upon and claims the benefit of priority from Japanese Patent Application No. 2018-158524, filed Aug. 27, 2018, the entire contents of which are incorporated herein by reference.

FIELD

Embodiments described herein relate generally to a semiconductor storage device.

BACKGROUND

A device including a loop antenna is known which communicates with an external device by using electromagnetic induction occurring in the loop antenna based on a magnetic field generated by the external device.

DETAILED DESCRIPTION

In order to manufacture the loop antenna, for example, a winding device for a coil is used. Embodiments provide a loop antenna, that can be manufactured at a lower cost because it does not require a special device such as a winding device.

In general, according to one embodiment, a semiconductor storage device includes a substrate having a first surface, a loop antenna, and a magnetic substance. The loop antenna includes a plurality of electrodes on the first surface including first, second, third, and fourth electrodes, first and second inner wirings provided in the substrate, and first and second outer wirings provided outside the substrate, the first outer wiring having a first end connected to the first electrode and a second end connected to the second electrode, the first inner wiring having a first end connected to the second electrode and a second end connected to the third electrode, the second outer wiring having a first end connected to the third electrode and a second end connected to the fourth electrode, and the second inner wiring having a first end connected to the fourth electrode and a second end connected to another electrode. The magnetic substance is provided on the first surface and surrounded by the first and second inner wirings and the first and second outer wirings.

First Embodiment

Hereinafter, a first embodiment will be described with reference to FIGS. 1 to 5. It is noted that in the present specification, components of the embodiment and descriptions of the components may be described using different expressions. The components and the descriptions of the components are not limited by the expressions used herein. The components may be described with a name different from that used in the present specification. In addition, the component may be described using an expression different from that used in the present specification.

Figure 1:
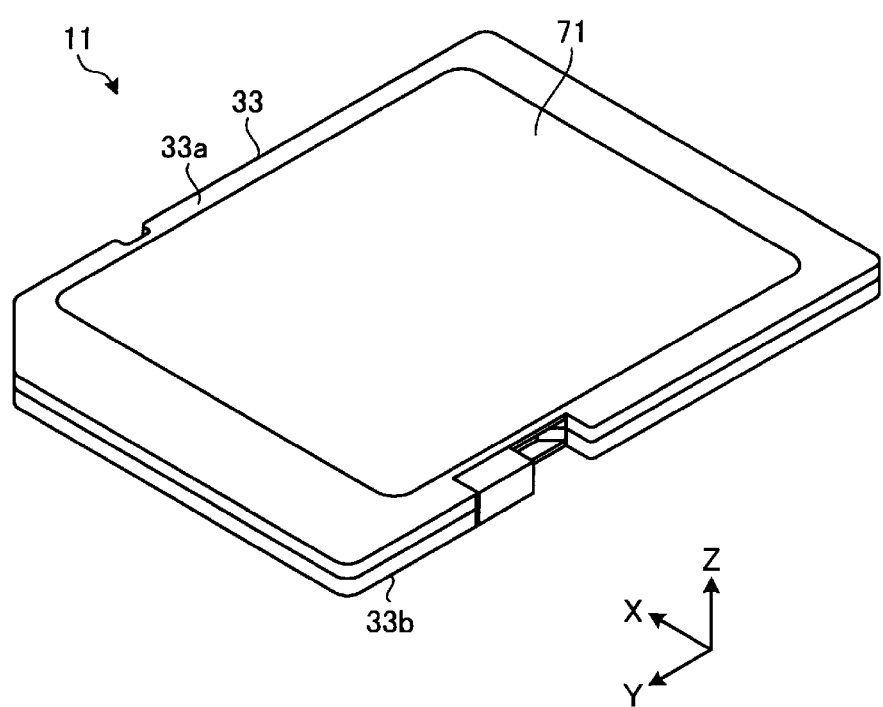
FIG. 1 is a perspective view of a memory card according to a first embodiment.

FIG. 1 is a perspective view of a memory card 11 according to the first embodiment. The memory card 11 is an example of a semiconductor storage device. In the present embodiment, the memory card 11 is an SD card. It is noted that the semiconductor storage device may be, for example, another device such as a microSD card, a multimedia card, or a USB flash memory. The semiconductor storage device includes a device or a system having a semiconductor chip.

As illustrated in each of the drawings, in the present specification, an X-axis, a Y-axis, and a Z-axis are defined. The X-axis, the Y-axis, and the Z-axis are orthogonal to each other. The X-axis is defined to extend along a width of the memory card 11. The Y-axis is defined to extend along a length of the memory card 11. The Z-axis is defined to extend along a thickness of the memory card 11.

A wireless communication technology is applied to the memory card 11 of the present embodiment. For example, a near field communication (NFC) using a frequency of 13.56 MHz is applied to the memory card 11. Another wireless communication technology may be applied to the memory card 11.

The memory card 11 to which the NFC is applied induces a current in a wireless antenna by electromagnetic induction. Therefore, as described below, the memory card 11 has the wireless antenna formed in a shape which may be referred to as, for example, a coil shape, a spiral shape, or a helical shape.

Figure 2:
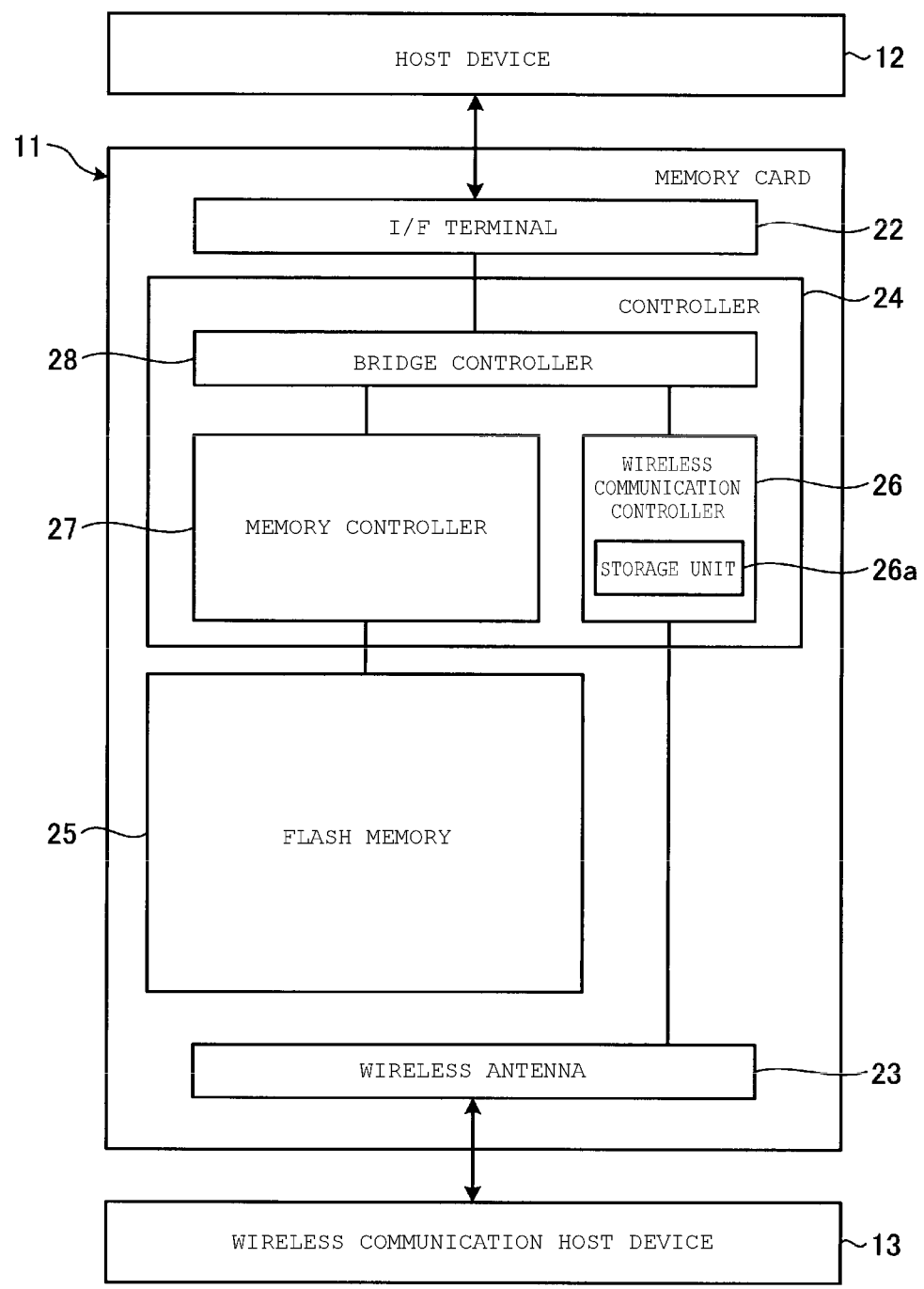
FIG. 2 is a block diagram of a system having the memory card according to the first embodiment.

FIG. 2 is a block diagram of a system having the memory card 11 according to the first embodiment. As illustrated in FIG. 2, the memory card 11 is configured to be electrically connected to a host device 12. The host device 12 is an example of an external device. Further, the memory card 11 is configured to wirelessly communicate with a wireless communication host device 13. Each of the host device 12 and the wireless communication host device 13 may be, for example, any of a personal computer, a portable computer, a smartphone, a mobile phone, a server, a smart card, a reader/writer, or another device.

The memory card 11 includes an interface (I/F) terminal 22, a wireless antenna 23, a controller 24, and a flash memory 25. The wireless antenna 23 is an example of a loop antenna and may be referred to as a coil, for example.

The controller 24 includes a wireless communication controller 26, a memory controller 27, and a bridge controller 28. In the present embodiment, the wireless communication controller 26, the memory controller 27, and the bridge controller 28 are integrated in the controller 24 as one electronic component. However, the wireless communication controller 26, the memory controller 27, and the bridge controller 28 may be respectively separate electronic components. In addition, for example, a plurality of electronic components, wirings, and programs may form the wireless communication controller 26, the memory controller 27, and the bridge controller 28, respectively. That is, each of the wireless communication controller 26, the memory controller 27, and the bridge controller 28 may be configured with one electric element, a plurality of electric elements, or one or the plurality of electric elements and a program.

The wireless communication controller 26 controls communication between the memory card 11 and the wireless communication host device 13. The wireless communication controller 26 includes a storage unit 26a. The memory controller 27 controls writing and reading of data to and from the flash memory 25.

The bridge controller 28 controls the wireless communication controller 26 and the memory controller 27. Further, the bridge controller 28 controls communication between the memory card 11 and the host device 12.

When the memory card 11 is electrically connected to the host device 12, the memory card 11 is operated by power supplied from the host device 12. For example, data is written into the memory card 11 by the host device 12 or the data is read from the memory card 11 by the host device 12.

The memory card 11 can transmit and receive data to and from the wireless communication host device 13 in a state in which the memory card 11 is not connected to another device such as the host device 12 and power is not supplied from the other device. For example, the memory card 11 can transmit and receive the data to and from the wireless communication host device 13 by induced electromotive force generated by the wireless antenna 23 based on electromagnetic induction. For example, the memory card 11 performs communication conforming to the NFC standard at a frequency of approximate 13.56 MHz, and transmits and receives the data to and from the wireless communication host device 13. In this way, the memory card 11 can operate without receiving power supply from the host device 12.

The memory card 11 according to the present embodiment transmits and receives the data to and from the host device 12 according to an SD interface protocol. The memory card 11 may transmit and receive the data to and from the host device 12 by using another interface protocol. The memory card 11 transmits and receives the data to and from the wireless communication host device 13 according to an NFC interface protocol. The memory card 11 may transmit and receive the data to and from the wireless communication host device 13 by using another wireless communication interface protocol. It is noted that the host device 12 and the wireless communication host device 13 may be the same device.

Figure 3:
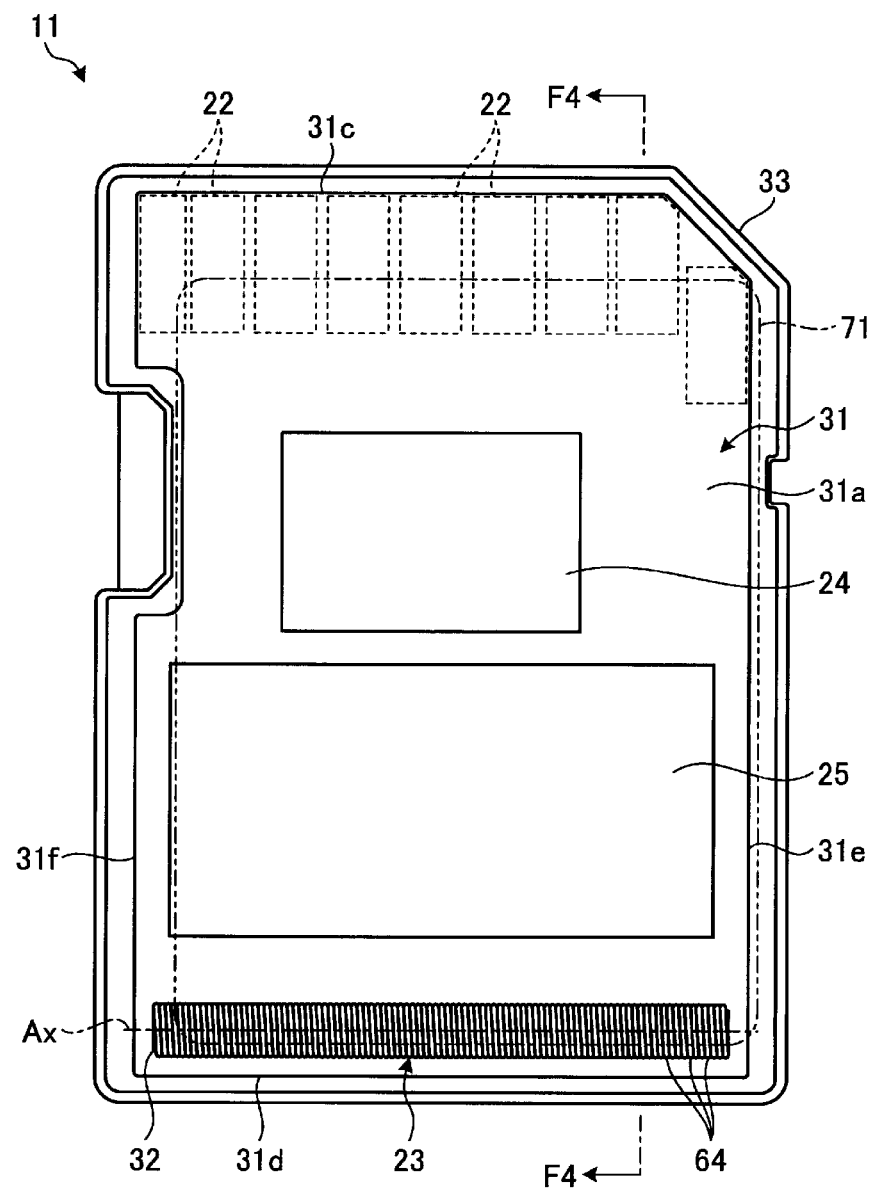
FIG. 3 is a plan view of the memory card according to the first embodiment.

FIG. 3 is a plan view of the memory card 11 according to the first embodiment. As illustrated in FIG. 3, the memory card 11 further includes a first substrate 31, a magnetic substance 32, and a housing 33. FIG. 3 illustrates the interior of the memory card 11 by removing a part of the housing 33.

Figure 4:
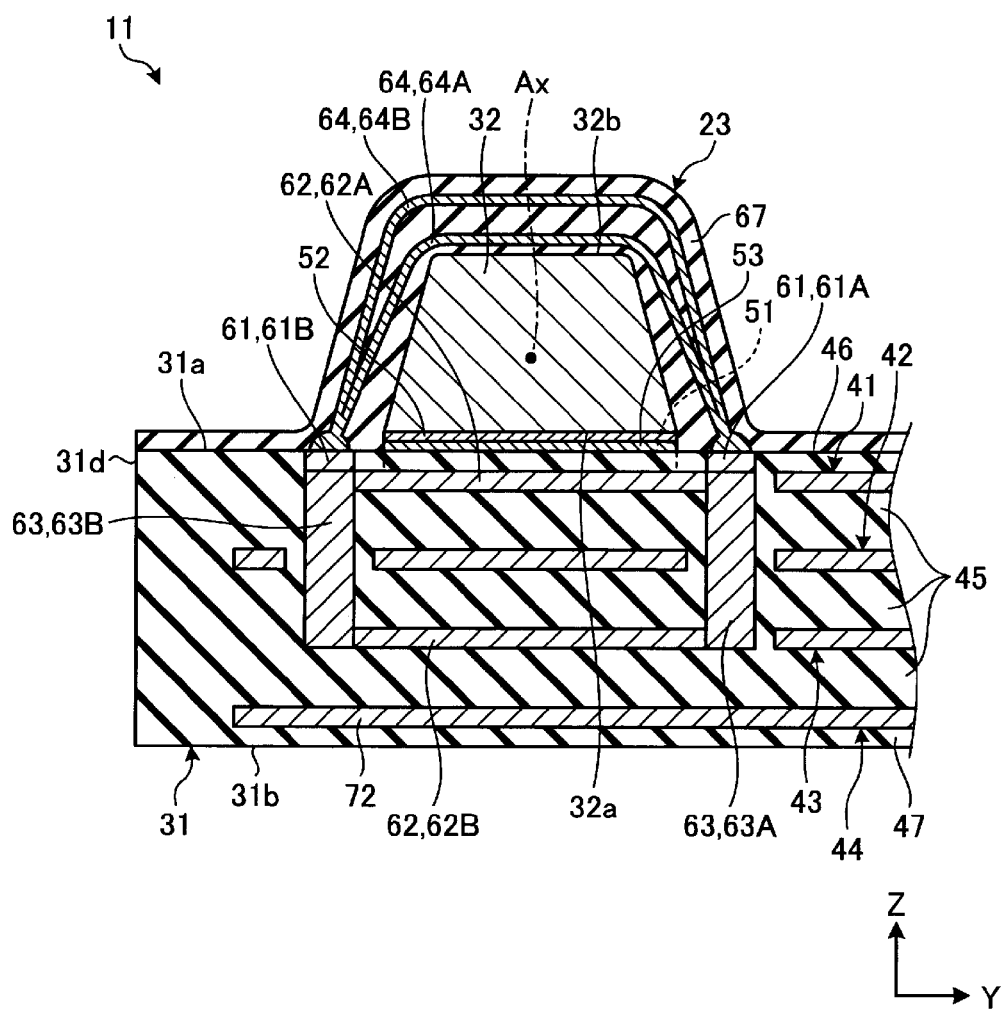
FIG. 4 illustrates a cross-section of a part of the memory card taken along the line F4-F4 in FIG. 3.

FIG. 4 illustrates a cross-section of a part of the memory card 11 taken along the line F4-F4 in FIG. 3. The first substrate 31 is, for example, a printed circuit board (PCB). The first substrate 31 has a first surface 31a and a second surface 31b.

The first surface 31a is an approximately flat surface facing a positive direction of the Z-axis (a direction indicated by the arrow of the Z-axis). The second surface 31b is located on an opposite side of the first surface 31a and is an approximately flat surface facing a negative direction of the Z-axis (a direction opposite to the arrow of the Z-axis).

As illustrated in FIG. 3, each of the memory card 11 and the first substrate 31 is formed in an approximately rectangular shape extending in the X-axis and the Y-axis directions. The first substrate 31 further has a first edge 31c, a second edge 31d, a third edge 31e, and a fourth edge 31f.

Each of the first edge 31c and the second edge 31d extends in the X-axis direction. The first edge 31c faces a positive direction of the Y-axis (a direction indicated by the arrow of the Y-axis). The second edge 31d is located on an opposite side of the first edge 31c and faces a negative direction of the Y-axis (a direction opposite to the arrow of the Y-axis).

The third edge 31e and the fourth edge 31f are respectively located at ends of the first edge 31c and the second edge 31d, and extend generally in the Y-axis direction. The third edge 31e and the fourth edge 31f may include a notch or a projection.

The first edge 31c and the second edge 31d are respectively shorter than the third edge 31e and the fourth edge 31f. Therefore, the first edge 31c and the second edge 31d form short sides of the first substrate 31 in an approximately rectangular shape. The third edge 31e and the fourth edge 31f form long sides of the first substrate 31 in the approximately rectangular shape.

The I/F terminal 22 includes a plurality of terminals. The plurality of terminals are provided on the second surface 31b, are adjacent to the first edge 31c, and are arranged along the first edge 31c. That is, the plurality of terminals are closer to the first edge 31c than to the second edge 31d and arranged in the X-axis direction or generally in the X-axis direction along which the first edge 31c extends.

The I/F terminal 22 of the present embodiment secures electrical connection to the host device 12 and is, for example, an SD interface terminal. In other words, the I/F terminal 22 can be electrically connected to the host device 12. The controller 24 and the flash memory 25 are disposed on the first surface 31a and are mounted on the first substrate 31.

As illustrated in FIG. 4, in the present embodiment, the first substrate 31 includes a plurality of stacked layers. For example, the first substrate 31 includes a first conductive layer 41, a second conductive layer 42, a third conductive layer 43, a fourth conductive layer 44, a plurality of insulating layers 45, a first solder-resist 46, and a second solder-resist 47. It is noted that the first substrate 31 is not limited to this example.

The first to fourth conductive layers 41 to 44 are made of a metal film and include, for example, a wiring pattern, a land, and a ground plane. The first conductive layer 41 is closer to the first surface 31a than the second to fourth conductive layers 42 to 44. The fourth conductive layer 44 is closer to the second surface 31b than the first to third conductive layers 41 to 43. The second conductive layer 42 is located between the first conductive layer 41 and the third conductive layer 43. The plurality of insulating layers 45 are located between the first to fourth conductive layers 41 to 44.

The first solder-resist 46 covers the first conductive layer 41 and forms the first surface 31a. It is noted that the first conductive layer 41 or the insulating layer 45 exposed by an opening provided in the first solder-resist 46 may be provided along the first surface 31a.

The second solder-resist 47 covers the fourth conductive layer 44 and forms the second surface 31b. It is noted that the fourth conductive layer 44 or the insulating layer 45 exposed by an opening provided in the second solder-resist 47 may be provided along the second surface 31b.

The magnetic substance 32 is, for example, ferrite. It is noted that the magnetic substance 32 may be another magnetic substance. In the present embodiment, the magnetic substance 32 has an approximately trapezoidal cross-sectional surface and is formed in a bar shape extending in the X-axis direction. It is noted that the magnetic substance 32 may have another cross-sectional shape such as a rectangular or semicircular shape. In addition, the magnetic substance 32 may be omitted.

The magnetic substance 32 has a bottom surface 32a and an outer surface 32b. The bottom surface 32a is an approximately flat surface facing the first surface 31a of the first substrate 31. The outer surface 32b includes a surface facing in the positive direction of the Z-axis and surfaces generally facing the Y-axis direction.

Figure 5:
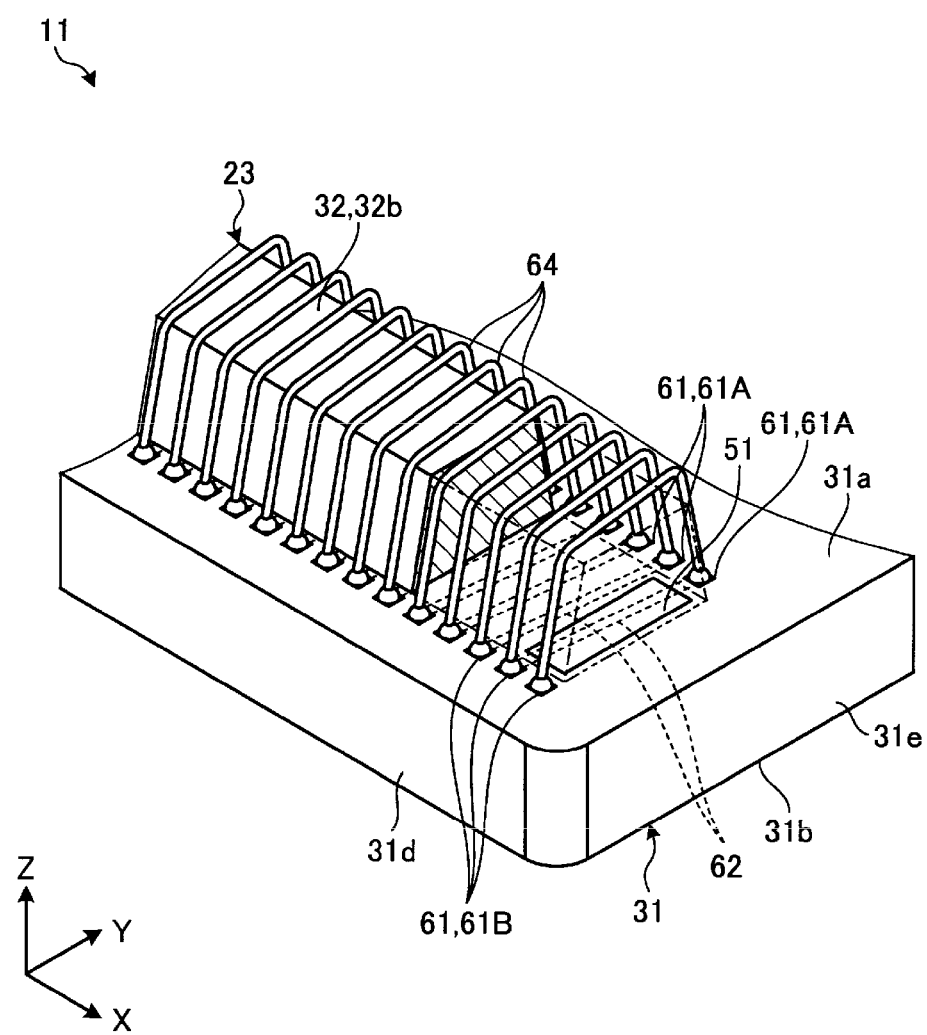
FIG. 5 is a perspective view of a part of the memory card according to the first embodiment.

FIG. 5 is a perspective view of a part of the memory card 11 according to the first embodiment. In FIG. 5, a part of the magnetic substance 32 is indicated by a two-dot chain line. As illustrated in FIG. 5, the magnetic substance 32 is provided on the first surface 31a. In the present embodiment, a fixing pad 51 is provided on the first surface 31a of the first substrate 31. The fixing pad 51 is a metal film and is a dummy pad (which is insulated) separated from wiring of the first conductive layer 41. Alternatively, the fixing pad 51 may be connected with the wiring of the first conductive layer 41.

As illustrated in FIG. 4, a metal film 52 is provided on the bottom surface 32a of the magnetic substance 32. The metal film 52 is attached to the fixing pad 51 by solder 53. Accordingly, the magnetic substance 32 is attached to the first surface 31a. It is noted that the magnetic substance 32 may be attached to the first surface 31a by another means such as an adhesive.

In the present embodiment, the wireless antenna 23 includes a coil provided in a spiral shape around the magnetic substance 32. A center Ax of the wireless antenna 23 in a spiral shape extends in the X-axis direction. Therefore, the wireless antenna 23 can generate a magnetic field in both directions of the X-axis. In this way, the wireless antenna 23 can generate a magnetic field in a direction which the third edge 31e and the fourth edge 31f of the first substrate 31 face.

A length of the wireless antenna 23 in the X-axis direction is greater than a length of the wireless antenna 23 in the Y-axis direction and is greater than a length of the wireless antenna 23 in the Z-axis direction. It is noted that a dimension of the wireless antenna 23 is not limited to this example. In addition, a direction, in which the center Ax of the wireless antenna 23 extends, may locally change.

As illustrated in FIG. 3, the wireless antenna 23 is adjacent to the second edge 31d of the first substrate 31 and extends along the second edge 31d. That is, the wireless antenna 23 is closer to the second edge 31d than to the first edge 31c and extends in the X-axis direction or generally in the X-axis direction in which the second edge 31d extends. Further, the wireless antenna 23 is separated from the I/F terminal 22 in the negative direction of the Y-axis and is closer to the second edge 31d than to the first edge 31c.

For example, a distance between the wireless antenna 23 and the second edge 31d is shorter than a quarter of a distance between the first edge 31c and the second edge 31d of the first substrate 31. It is noted that a location of the wireless antenna 23 is not limited to this example.

As illustrated in FIG. 4, the wireless antenna 23 includes a plurality of pads 61 (including 61A and 61B), a plurality of inner wirings 62 (including 62A and 62B), a plurality of vias 63 (including 63A and 63B), and a plurality of outer wirings 64 (including 64A and 64B). The pad 61 may also be referred to as an electrode, for example. The via 63 may also be referred to as a via hole, for example.

As illustrated in FIG. 5, the plurality of pads 61 are provided on the first surface 31a of the first substrate 31 and arranged in two rows in the X-axis direction. The plurality of pads 61 includes a plurality of pads 61A forming one row and a plurality of pads 61B forming the other row.

The pad 61A is closer to the first edge 31c of the first substrate 31 than the magnetic substance 32 is. The plurality of pads 61A are arranged on the first surface 31a with an interval in the X-axis direction. The pad 61B is closer to the second edge 31d of the first substrate 31 than the magnetic substance 32 is. The plurality of pads 61B are arranged on the first surface 31a with an interval in the X-axis direction. Between the plurality of pads 61A and the plurality of pads 61B, the magnetic substance 32 and the fixing pad 51 are located.

As illustrated in FIG. 4, the plurality of inner wirings 62 is provided in the first substrate 31. The plurality of inner wirings 62 include a plurality of inner wirings 62A and a plurality of inner wirings 62B. The inner wirings 62A are provided in the first conductive layer 41. The inner wirings 62B are provided in the third conductive layer 43. It is noted that the inner wirings 62A and 62B are not limited to this example and may be provided in the second conductive layer 42 or the fourth conductive layer 44.

The inner wiring 62B extends approximately parallel to the corresponding inner wiring 62A and is overlapped with the corresponding inner wiring 62A in the Z-axis direction. It is noted that the inner wiring 62A and the inner wiring 62B may have different shapes. For example, by providing the inner wiring 62A to be longer than the inner wiring 62B, a length of an electrical path passing through the inner wiring 62A in the wireless antenna 23 and a length of an electrical path passing through the inner wiring 62B are made to coincide with each other or approximate with each other.

The via 63 is provided in the first substrate 31 and connects the first conductive layer 41 and the third conductive layer 43 with each other. The via 63 may be of various types including ones that are plated through via holes. The via 63 connects the inner wiring 62A, the inner wiring 62B, and the pad 61 with each other. The plurality of vias 63 include a plurality of vias 63A connected to the plurality of pads 61A and a plurality of vias 63B connected to the plurality of pads 61B.

One end portion of the inner wiring 62 is connected to the via 63A and is electrically connected to the pad 61A through the via 63A. The other end portion of the inner wiring 62 is connected to the via 63B and is electrically connected to the pad 61B through the via 63B. Therefore, the plurality of inner wirings 62 extend between the pad 61A and the pad 61B across the magnetic substance 32. The inner wiring 62 is electrically connected with the pad 61A and the pad 61B through the via 63.

In the present embodiment, the plurality of outer wirings 64 are bonding wires. The bonding wire may also be referred to as a wire, a metal wire, or a wiring material, for example.

The outer wirings 64 are provided outside of the first substrate 31, and distinguished from a wiring pattern provided on the first substrate 31. The outer wirings 64 are respectively connected with the pad 61A and the pad 61B. Therefore, the outer wirings 64 electrically and respectively connect the plurality of inner wirings 62 to each other.

In detail, one end portion of the outer wiring 64 is connected to the pad 61A. Therefore, one end portion of the outer wiring 64 is connected to the via 63A and the inner wiring 62 connected to the pad 61A, through the pad 61A. The other end portion of the outer wiring 64 is connected to the pad 61B. Therefore, the other end portion of the outer wiring 64 is connected to the via 63B and the inner wiring 62 connected to the pad 61B, through the pad 61B. The via 63 connects the inner wiring 62 and the outer wiring 64 to each other.

The outer wiring 64 electrically connects one inner wiring 62 connected to the pad 61A and the other one inner wiring 62 connected to the pad 61B to each other. In this way, the outer wirings 64 respectively and electrically connect the inner wiring 62 connected to the pad 61A and the inner wiring 62 connected to the pad 61B to each other. It is noted that the outer wiring 64 may connect the inner wiring 62 connected to the pad 61A and the inner wiring 62 connected to the pad 61B to each other without passing through the via 63.

The plurality of outer wirings 64 extend between the pad 61A and the pad 61B across the magnetic substance 32. The outer wiring 64 extends approximately along the outer surface 32b of the magnetic substance 32 while being separated from the magnetic substance 32. It is noted that the outer wiring 64 may be in contact with the magnetic substance 32.

As illustrated in FIG. 5, the plurality of outer wirings 64 connect the plurality of inner wirings 62 from each other, so that a coil in a spiral shape is formed. In the coil, the inner wiring 62 and the outer wiring 64 are alternately connected between the pad 61 and the via 63. The magnetic substance 32 is located inside the wireless antenna 23 as the core.

As illustrated in FIG. 4, the plurality of outer wirings 64 include a plurality of outer wirings 64A and a plurality of outer wirings 64B. It is noted that FIG. 5 illustrates the outer wiring 64 obtained by omitting one of the outer wirings 64A and 64B.

One end portion of the outer wiring 64A and one end portion of the outer wiring 64B are connected to the common pad 61A. The other end portion of the outer wiring 64A and the other end portion of the outer wiring 64B are connected to the common pad 61B. Therefore, the outer wiring 64A and the outer wiring 64B are electrically connected to the respective inner wirings 62 in parallel. It is noted that only one of the outer wirings 64 may be electrically connected to each of the inner wirings 62 or three or more outer wirings 64 may be electrically connected to the respective inner wirings 62 in parallel.

Further, the inner wiring 62A and the inner wiring 62B are electrically connected to the respective outer wirings 64 in parallel. It is noted that only one of the inner wirings 62 may be electrically connected to each of the outer wirings 64 or three or more inner wirings 62 may be electrically connected to the respective outer wirings 64 in parallel.

The plurality of outer wirings 64 and the magnetic substance 32 are buried in an insulator 67. The insulator 67 is, for example, synthetic resin. The insulator 67 is interposed between the plurality of outer wirings 64 and prevents a short-circuit of the plurality of outer wirings 64 from each other. It is noted that the outer wiring 64A and the outer wiring 64B connected to the common pad 61 may be in contact with each other.

As illustrated in FIG. 2, the wireless antenna 23 is electrically connected to the wireless communication controller 26. Based on electromagnetic induction caused by a magnetic flux passing through the inside of the wireless antenna 23, the wireless antenna 23 supplies induced electromotive force to the wireless communication controller 26. In this way, the wireless antenna 23 performs communication with an external device based on the electromagnetic induction.

For example, when the wireless antenna 23 receives a radio wave transmitted from the wireless communication host device 13, the wireless antenna 23 generates a current or a voltage based on the electromagnetic induction. The wireless antenna 23 supplies the generated power to the wireless communication controller 26.

The wireless antenna 23 of the present embodiment is set corresponding to a predetermined frequency or a frequency bandwidth corresponding to the NFC. For example, a resonance frequency of the wireless antenna 23 is set to approximate 13.56 MHz.

The wireless antenna 23 transmits the data received from the wireless communication host device 13, to the wireless communication controller 26. Further, the wireless antenna 23 transmits the data received from the wireless communication controller 26, to the wireless communication host device 13.

The wireless communication controller 26 can communicate with the wireless communication host device 13 via the wireless antenna 23. The wireless communication controller 26 controls the NFC using the wireless antenna 23 for the wireless communication host device 13.

The wireless communication controller 26 can operate by the power generated by the wireless antenna 23 based on the electromagnetic induction described above. The wireless communication controller 26 receives a signal or data represented by the current or the voltage generated by the wireless antenna 23 based on the radio wave from the wireless communication host device 13 and operates according to the signal or the data. For example, at the time of operation, the wireless communication controller 26 receives the data from the wireless communication host device 13 via the wireless antenna 23 at a predetermined frequency corresponding to the NFC and writes the data in the storage unit 26a. In addition, at the time of the operation, the wireless communication controller 26 reads the data written in the storage unit 26a and transmits the data to the wireless communication host device 13 via the wireless antenna 23. More specifically, when the wireless communication controller 26 receives the signal at the predetermined frequency corresponding to the NFC via the wireless antenna 23, the wireless communication controller 26 can perform communication by the NFC.

The bridge controller 28 can communicate with the host device 12 via the I/F terminal 22. At the time of writing to the flash memory 25, the bridge controller 28 transmits the data received from the host device 12 via the I/F terminal 22, to the memory controller 27. At the time of reading from the flash memory 25, the bridge controller 28 transmits the data received from the memory controller 27, to the host device 12 via the I/F terminal 22.

In a case where the memory card 11 is electrically connected to the host device 12, sufficient power is supplied to the wireless communication controller 26. In this case, the wireless communication controller 26 may write the data received from the wireless communication host device 13 via the wireless antenna 23 by the NFC and written in the storage unit 26a, in the flash memory 25 via the bridge controller 28 and the memory controller 27.

In a case where the sufficient power is supplied to the wireless communication controller 26, the wireless communication controller 26 may read the data written in the flash memory 25 via the bridge controller 28 and the memory controller 27, generate data, and write the data in the storage unit 26a.

In a case where the sufficient power is supplied to the wireless communication controller 26, the wireless communication controller 26 may read some pieces or all pieces of the data written in the flash memory 25 via the bridge controller 28 and the memory controller 27, and transmit the read data to the wireless communication host device 13 via the wireless antenna 23.

The storage unit 26a is a low power consumption memory operable by the power generated by the wireless antenna 23. The power consumption for writing and reading the data to and from the storage unit 26a is smaller than power consumption for writing and reading the data to and from the flash memory 25.

The storage unit 26a is, for example, a nonvolatile memory. The storage unit 26a stores data based on control by the wireless communication controller 26. It is noted that the storage unit 26a may be a memory which temporally stores data. The storage unit 26a is, for example, an electrically erasable programmable read-only memory (EEPROM). The storage unit 26a may be another type of memory.

As described above, the wireless communication controller 26 and the storage unit 26a can operate by power induced to the wireless antenna 23 by the radio wave from the wireless communication host device 13. However, in a case where power is supplied from the host device 12 to the memory card 11, the wireless communication controller 26 and the storage unit 26a may operate by the power supplied from the host device 12.

For example, the flash memory 25 is a NAND flash memory. It is noted that instead of the flash memory 25, the memory card 11 may include another nonvolatile memory such as a NOR type flash memory, a magnetoresistive random access memory (MRAM), a phase change random access memory (PRAM), a resistive random access memory (ReRAM), or a ferroelectric random access memory (FeRAM).

The memory controller 27 controls writing and reading of data to and from the flash memory 25. More specifically, in a case of receiving a write command and data from the host device 12 via the I/F terminal 22 and the bridge controller 28, the memory controller 27 writes the data to the flash memory 25. In a case of receiving a read command from the host device 12 via the I/F terminal 22 and the bridge controller 28, the memory controller 27 reads data from the flash memory 25 and transmits the data to the host device 12 via the bridge controller 28 and the I/F terminal 22.

For example, in a case where the memory card 11 is electrically connected to the host device 12, sufficient power is supplied to the memory controller 27. In this case, the memory controller 27 may write the data received from the wireless communication host device 13 via the wireless antenna 23, the wireless communication controller 26, and the bridge controller 28, to the flash memory 25. In a case where the sufficient power is supplied to the memory controller 27, the memory controller 27 may transmit the data read from the flash memory 25, to the wireless communication host device 13 via the bridge controller 28, the wireless communication controller 26, and the wireless antenna 23.

The flash memory 25 and the memory controller 27 operate by the power supplied from the host device 12.

For example, the data described above may be data to be transmitted and received between the wireless communication host device 13 and the memory card 11 according to the NFC interface, may be feature data of the data written in the flash memory 25, may be feature data received from the wireless communication host device 13 to the wireless communication controller 26 via the wireless antenna 23, may be feature data related to the flash memory 25, or may be feature data related to the memory card 11. More specifically, for example, the data may be some pieces (for example, first or last) of image data written in the flash memory 25, thumbnail data, management information of the data written in the flash memory 25, a memory capacitance of the flash memory 25, a remaining capacitance of the flash memory 25, a name of a file written in the flash memory 25, a generation time of the data, imaging time data in a case where the data is image data, or the number of files written in the flash memory 25.

In the present embodiment, a write instruction and data from the host device 12 are first received to the bridge controller 28 and then received to the memory controller 27. This is to first determine whether the bridge controller 28 receives the write instruction and the data from the host device 12 or from the wireless communication host device 13, and to change the operation according to a determination result.

In the present embodiment, for example, the memory card 11 and the wireless communication host device 13 transmit and receive data (hereinafter, referred to as lock function data) related to permission or prohibition of writing and reading data to and from the flash memory 25. The lock function data is stored in the storage unit 26a. It is noted that the memory card 11 and the storage unit 26a are not limited to this example.

The wireless communication controller 26 writes the lock function data to the storage unit 26a based on the data received from the wireless communication host device 13. When receiving the data from the host device 12, the bridge controller 28 refers to the lock function data stored in the storage unit 26a. In a case where writing and reading of data to and from the flash memory 25 are prohibited, the bridge controller 28 does not transmit and receive the data to and from the memory controller 27. In a case where writing and reading of data to and from the flash memory 25 are permitted, the bridge controller 28 transmits and receives the data to and from the memory controller 27 as described above.

In some cases, the memory card 11 communicates with another wireless communication host device 13 while being accommodated in a slot of a connector of the host device 12, for example. The wireless antenna 23 is located outside the connector or near an opening end of the connector. Therefore, the magnetic flux can pass through the inside of the wireless antenna 23 and the memory card 11 can communicate with the wireless communication host device 13.

As illustrated in FIG. 3, the housing 33 accommodates the first substrate 31. The housing 33 is made of, for example, a synthetic resin which is a nonmagnetic substance and an insulator. The housing 33 may be made of other materials.

As illustrated in FIG. 1, the housing 33 has a first outer surface 33a and a second outer surface 33b. The first outer surface 33a is an approximately flat surface facing the positive direction of the Z-axis. The second outer surface 33b is located on an opposite side of the first outer surface 33a and is an approximately flat surface facing the negative direction of the Z-axis.

The I/F terminal 22 is not covered with the housing 33 and is exposed at the second outer surface 33b. Further, a label 71 is attached to the first outer surface 33a. The label 71 may also be referred to as a seal, for example. The label 71 is made of metal or includes metal. The label 71 covers at least a part of the wireless antenna 23 in the Z-axis direction.

As illustrated in FIG. 4, the fourth conductive layer 44 includes a solid pattern (plane) 72. The solid pattern 72 covers at least a part of the wireless antenna 23 in the Z-axis direction. Therefore, in the Z-axis direction, a part of the wireless antenna 23 is located between the label 71 and the solid pattern 72.

For example, the label 71 and the solid pattern 72 prevents the frequency of the electromagnetic wave from being deviated by using the host device 12 and a metallic housing of the connector. It is noted that the memory card 11 of an alternative embodiment may not include the label 71 and the solid pattern 72.

The wireless antenna 23 described above is made, for example, as follows. First, the magnetic substance 32 is attached to the fixing pad 51 of the first substrate 31 by the solder 53. At the same time, the controller 24 and the flash memory 25 may be mounted on the first substrate 31 by a front surface mounting technology.

Next, the outer wiring 64 is connected to the pad 61A and the pad 61B by a wire bonder. At the same time, the controller 24 and the flash memory 25 may be mounted on the first substrate 31 by wire bonding.

Next, the magnetic substance 32 and the outer wiring 64 are buried in the insulator 67. The controller 24 and the flash memory 25 may be buried on the insulator 67. As described above, the wireless antenna 23 is made.

As described above, the wireless antenna 23 can be made by a technology for mounting an electronic component such as the controller 24 and the flash memory 25 on the first substrate 31 such as soldering or wire bonding. Therefore, the wireless antenna 23 can be made without using a device for manufacturing a coil such as a winding device.

In the memory card 11 according to the first embodiment described above, the wireless antenna 23 generates a magnetic field in a direction intersecting with the positive direction of the Z-axis in which the first surface 31a of the first substrate 31 faces, so that even if a top of the first surface 31a is covered with a metal such as a housing of the host device 12, the wireless antenna 23 can perform wireless communication with the wireless communication host device 13. The wireless antenna 23 includes the plurality of inner wirings 62 provided in the first substrate 31, and the plurality of outer wirings 64 which are provided outside of the first substrate 31 and which electrically connect one inner wiring 62 and the other one inner wiring 62 with each other. That is, since the inner wiring 62 provided on the first substrate 31 can be used as a part of the wireless antenna 23, the wireless antenna 23 can be easily provided without a special device such as a winding device which winds a wire. Accordingly, it is possible to reduce the cost of the memory card 11.

The plurality of terminals of the I/F terminal 22 are arranged along the first edge 31c. Therefore, when the memory card 11 is inserted into the connector of the host device 12, the first edge 31c is located more inside the host device 12 than the second edge 31d and the second edge 31d is located outside the connector or near the opening end of the connector. The wireless antenna 23 is closer to the second edge 31d than to the first edge 31c. Therefore, the wireless antenna 23 can be located outside the connector or near the opening end of the connector, so that even if the top of the first surface 31a is covered with a metal, the wireless antenna 23 can perform wireless communication with the wireless communication host device 13.

The wireless antenna 23 extends along the second edge 31d. Accordingly, both ends of the wireless antenna 23 can be located outside the connector or near the opening end of the connector and it is possible to prevent the magnetic field entering and leaving one end of the wireless antenna 23 from being influenced by the metal covering the top of the first surface 31a. Accordingly, even if the top of the first surface 31a is covered with a metal, the wireless antenna 23 can perform wireless communication with the wireless communication host device 13.

The plurality of outer wirings 64 include a plurality of bonding wires. Accordingly, it is possible to provide the plurality of outer wirings 64 by a wire bonder and to easily provide the wireless antenna 23. Accordingly, it is possible to reduce the cost of the memory card 11.

The two or more inner wirings 62A and 62B are electrically connected to the respective outer wirings 64 in parallel. Accordingly, it is possible to reduce an electrical resistance in the wireless antenna 23 and to enlarge a range in which wireless communication can be performed by the wireless antenna 23.

The two or more outer wirings 64A and 64B are electrically connected to the respective inner wirings 62 in parallel. Accordingly, it is possible to reduce an electrical resistance in the wireless antenna 23 and to enlarge a range in which wireless communication can be performed by the wireless antenna 23.

The wireless antenna 23 includes the plurality of vias 63A provided in the first substrate 31 and connected to the plurality of pads 61A, and the plurality of vias 63B provided in the first substrate 31 and connected to the plurality of pads 61B. One end portion of the plurality of inner wirings 62 is connected to the via 63A and the other end portion of the plurality of inner wirings 62 is connected to the via 63B. Accordingly, it is possible to enlarge a diameter of the coil of the wireless antenna 23 and a range in which wireless communication can be performed by the wireless antenna 23.

Second Embodiment

Hereinafter, a second embodiment will be described with reference to FIG. 6. It is noted that in the following description of the embodiments, components having the same functions as the already described components are given the same reference numerals as those of the components described above, and a further description may be omitted in some cases. In addition, a plurality of components denoted by the same reference numerals may not necessarily have in common all of the functions and properties, and may have different functions and properties according to each of the embodiments.

Figure 6:
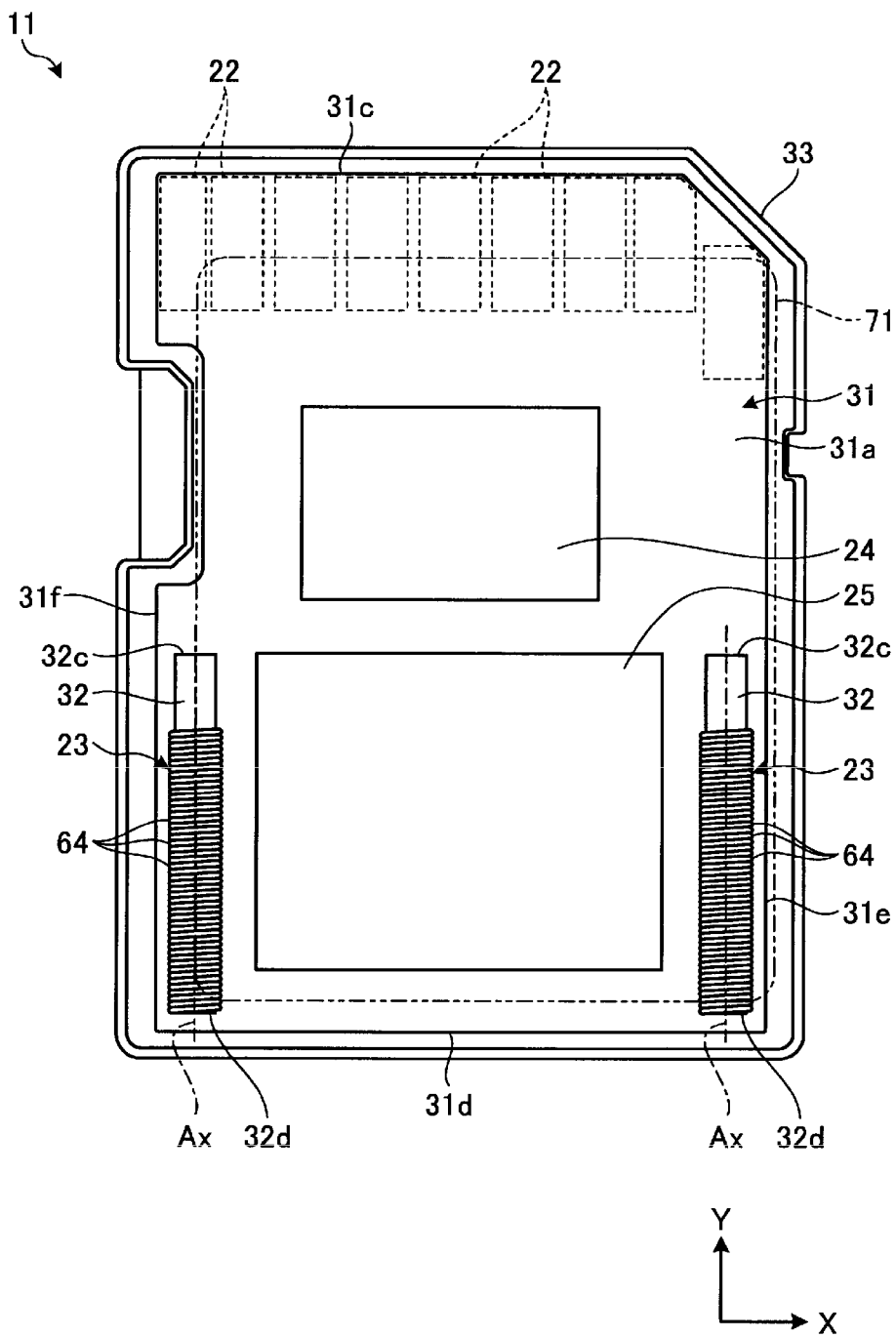
FIG. 6 is a plan view of a memory card according to a second embodiment.

FIG. 6 is a plan view of the memory card 11 according to the second embodiment. As illustrated in FIG. 6, the memory card 11 according to the second embodiment includes the two wireless antennas 23 and the two magnetic substances 32.

One wireless antenna 23 and one magnetic substance 32 extend along the third edge 31e of the first substrate 31. That is, one wireless antenna 23 is closer to the third edge 31e than to the fourth edge 31*f* and extends in the Y-axis direction or generally in the Y-axis direction along which the third edge 31*e* extends.

The other wireless antenna 23 and the other magnetic substance 32 extend along the fourth edge 31*f* of the first substrate 31. That is, the other wireless antenna 23 is closer to the fourth edge 31*f* than to the third edge 31*e* and extends in the Y-axis direction or generally in the Y-axis direction along which the fourth edge 31*f* extends.

The two wireless antennas 23 are separated from the I/F terminal 22 in the negative direction of the Y-axis and are closer to the second edge 31*d* than to the first edge 31*c*. For example, a distance between a center of the wireless antenna 23 and the second edge 31*d* is shorter than a quarter of a distance between the first edge 31*c* and the second edge 31*d* of the first substrate 31.

The magnetic substance 32 has a first end portion 32*c* and a second end portion 32*d*. The first end portion 32*c* and the second end portion 32*d* are end portions in a longitudinal direction of the magnetic substance 32, and in the present embodiment, the first end portion 32*c* and the second end portion 32*d* are end portions in the Y-axis direction.

The first end portion 32*c* and the second end portion 32*d* are located outside the wireless antenna 23. The magnetic substance 32 is longer than the wireless antenna 23. The first end portion 32*c* is an end portion of the magnetic substance 32 in the positive direction of the Y-axis. The second end portion 32*d* is an end portion of the magnetic substance 32 in the negative direction of the Y-axis and is located on an opposite side of the first end portion 32*c*. The second end portion 32*d* is closer to the second edge 31*d* than the first end portion 32*c*. For example, a distance between the second end portion 32*d* and the second edge 31*d* is shorter than a quarter of a distance between the first edge 31*c* and the second edge 31*d* of the first substrate 31.

A distance between the first end portion 32*c* and the wireless antenna 23 is longer than a distance between the second end portion 32*d* and the wireless antenna 23. In other words, a length of a part including the first end portion 32*c* of the magnetic substance 32 protruding from the wireless antenna 23 is longer than a length of a part including the second end portion 32*d* of the magnetic substance 32 protruding from the wireless antenna 23.

In the memory card 11 according to the second embodiment described above, the distance between the first end portion 32*c* and the wireless antenna 23 is longer than the distance between the second end portion 32*d* and the wireless antenna 23. Accordingly, it is possible to increase directivity of the wireless antenna 23 by making the magnetic substance 32 longer and to enlarge a range in which wireless communication can be performed by the wireless antenna 23. In addition, as a distance between the end portion of the wireless antenna 23 close to the first end portion 32*c* and the second edge 31*d* is shorter, so that it is possible to reduce the magnetic field entering and leaving the end of the wireless antenna 23 from being influenced by a metal such as the housing of the host device 12. Accordingly, even if the top of the first surface 31*a* is covered with a metal, the wireless antenna 23 can perform wireless communication with the wireless communication host device 13.

Third Embodiment

Figure 7:
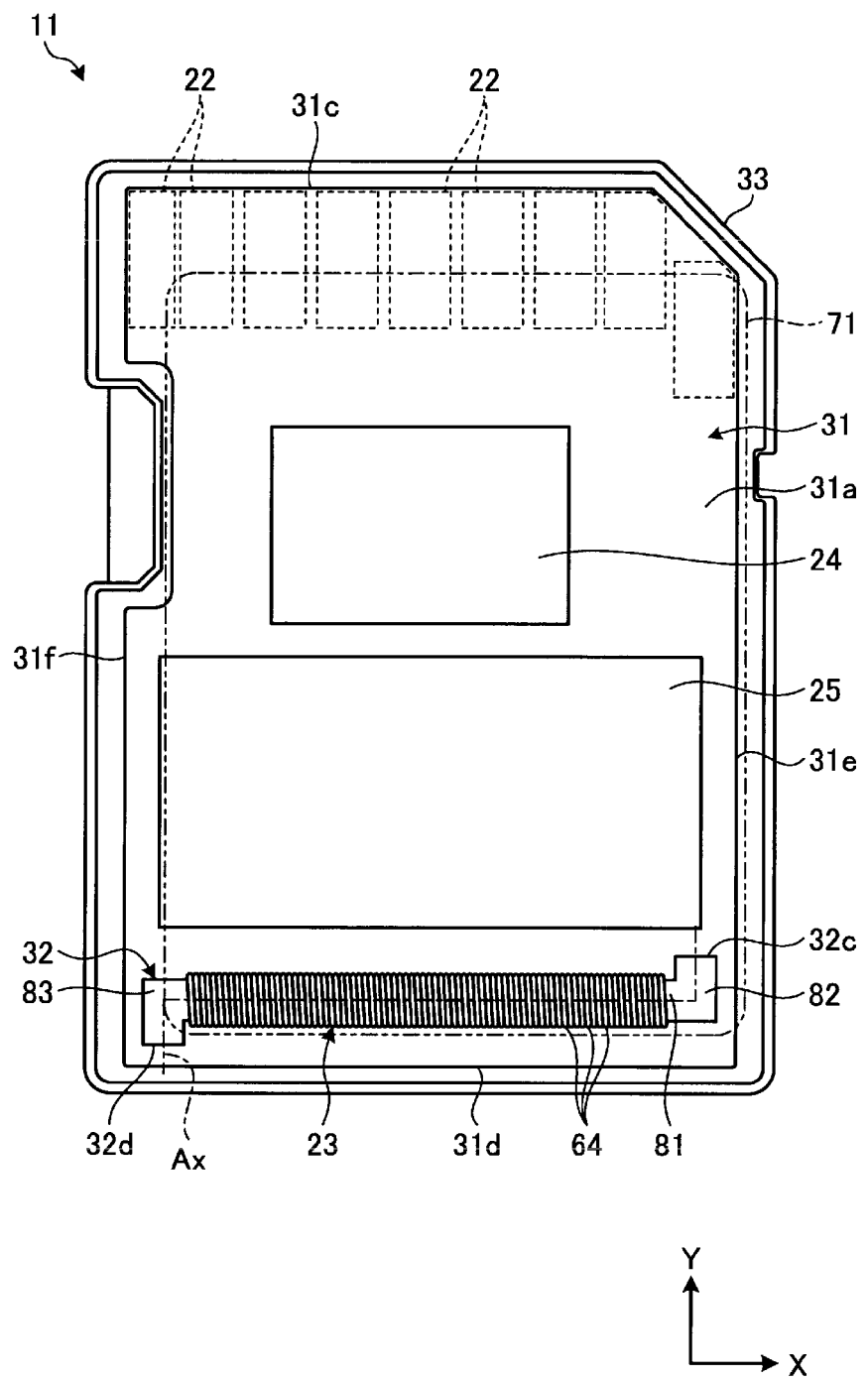
FIG. 7 is a plan view of a memory card according to a third embodiment.

Hereinafter, a third embodiment will be described with reference to FIG. 7. FIG. 7 is a plan view of the memory card 11 according to the third embodiment. As illustrated in FIG. 7, the memory card 11 according to the third embodiment is different from the first embodiment in that the magnetic substance 32 includes a first part 81, a second part 82, and a third part 83.

The first part 81 extends in an X-axis direction. The second part 82 extends from one end portion of the first part 81 in the X-axis direction, in the positive direction of the Y-axis. The third part 83 extends from the other end portion of the first part 81 in the X-axis direction, in the negative direction of the Y-axis.

The first part 81 is located inside the wireless antenna 23. The second part 82 and the third part 83 are located outside the wireless antenna 23. It is noted that the second part 82 and the third part 83 may be located inside the wireless antenna 23.

The second part 82 includes the first end portion 32*c* of the magnetic substance 32. In the present embodiment, the first end portion 32*c* faces the positive direction of the Y-axis. The third part 83 includes the second end portion 32*d* of the magnetic substance 32. In the present embodiment, the second end portion 32*d* faces the negative direction of the Y-axis.

In the memory card 11 according to the third embodiment described above, the second part 82 of the magnetic substance 32 extends from the first part 81 in the positive direction of the Y-axis. Further, the third part 83 extends from the first part 81 in the negative direction of the Y-axis. Accordingly, it is possible to increase directivity of the wireless antenna 23 in the Y-axis direction and to enlarge a range in which wireless communication can be performed by the wireless antenna 23.

Fourth Embodiment

Figure 8:
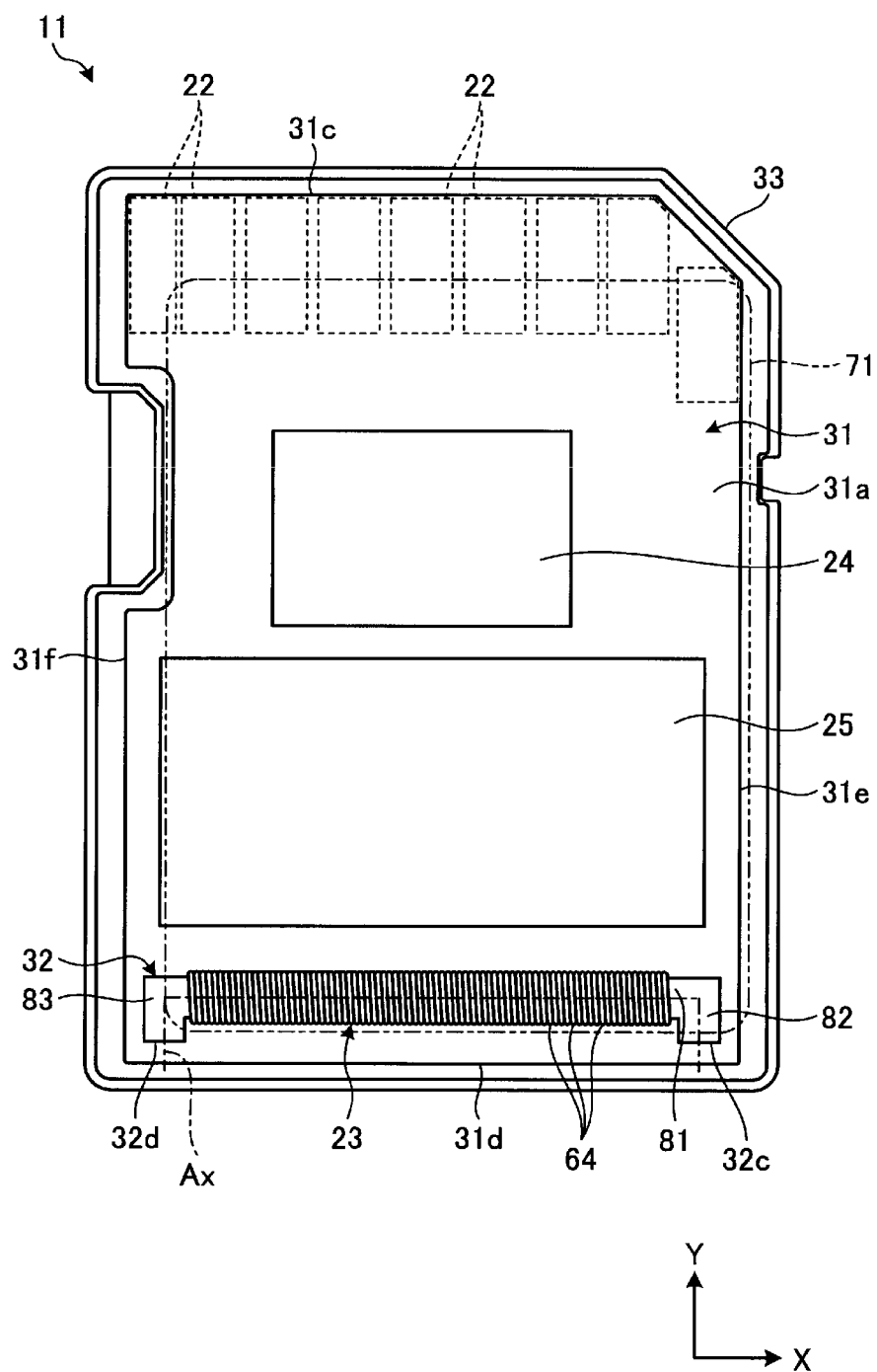
FIG. 8 is a plan view of a memory card according to a fourth embodiment.

Hereinafter, a fourth embodiment will be described with reference to FIG. 8. FIG. 8 is a plan view of the memory card 11 according to the fourth embodiment. As illustrated in FIG. 8, the memory card 11 according to the fourth embodiment is different from the third embodiment in that the second part 82 extends from the first part 81 in the negative direction of the Y-axis.

In the present embodiment, the first end portion 32*c* and the second end portion 32*d* of the magnetic substance 32 face the negative direction of the Y-axis. Therefore, the magnetic field of the wireless antenna 23 is biased in the negative direction of the Y-axis, as compared with the first embodiment.

In the memory card 11 according to the fourth embodiment described above, the first end portion 32*c* and the second end portion 32*d* of the magnetic substance 32 face the negative direction of the Y-axis. Accordingly, the wireless antenna 23 can generate a magnetic field toward an outside of the opening end of the connector while the memory card 11 is accommodated in the connector of the host device 12. Accordingly, the wireless antenna 23 can perform wireless communication with the wireless communication host device 13.

Fifth Embodiment

Figure 9:
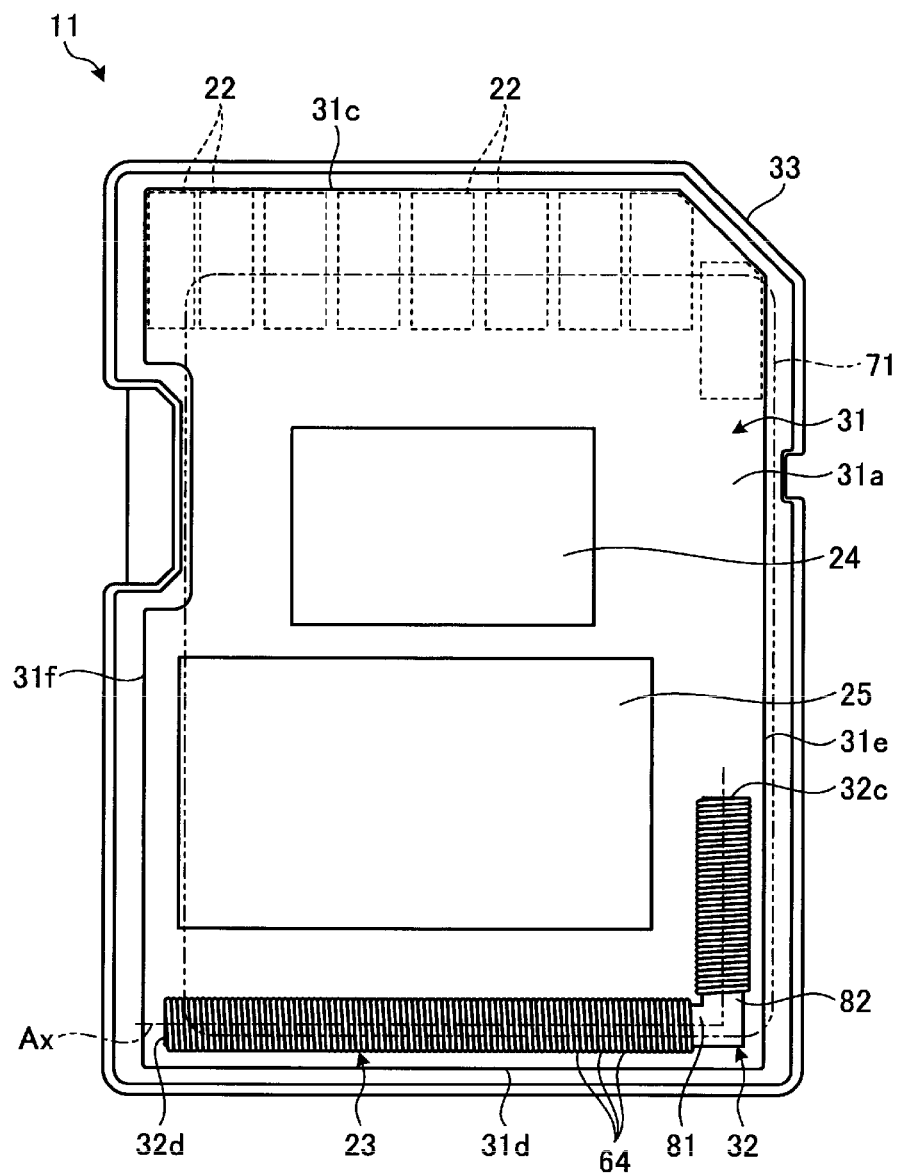
FIG. 9 is a plan view of a memory card according to a fifth embodiment.

Hereinafter, a fifth embodiment will be described with reference to FIG. 9. FIG. 9 is a plan view of the memory card 11 according to the fifth embodiment. As illustrated in FIG. 9, the memory card 11 according to the fifth embodiment is different from the first embodiment in that the magnetic substance 32 includes the first part 81 and the second part 82.

The first part 81 extends in an X-axis direction. The second part 82 extends from one end portion of the first part 81 in the X-axis direction, in the positive direction of the Y-axis. The first part 81 and the second part 82 are located inside the wireless antenna 23. It is noted that the first part 81 and the second part 82 may be located on insides of the two wireless antennas 23 that are different from each other.

In the memory card 11 according to the fifth embodiment described above, the first part 81 and the second part 82 are located inside the wireless antenna 23. Accordingly, it is possible to lengthen the wireless antenna 23 and to enlarge a range in which wireless communication can be performed by the wireless antenna 23.

Sixth Embodiment

Figure 10:
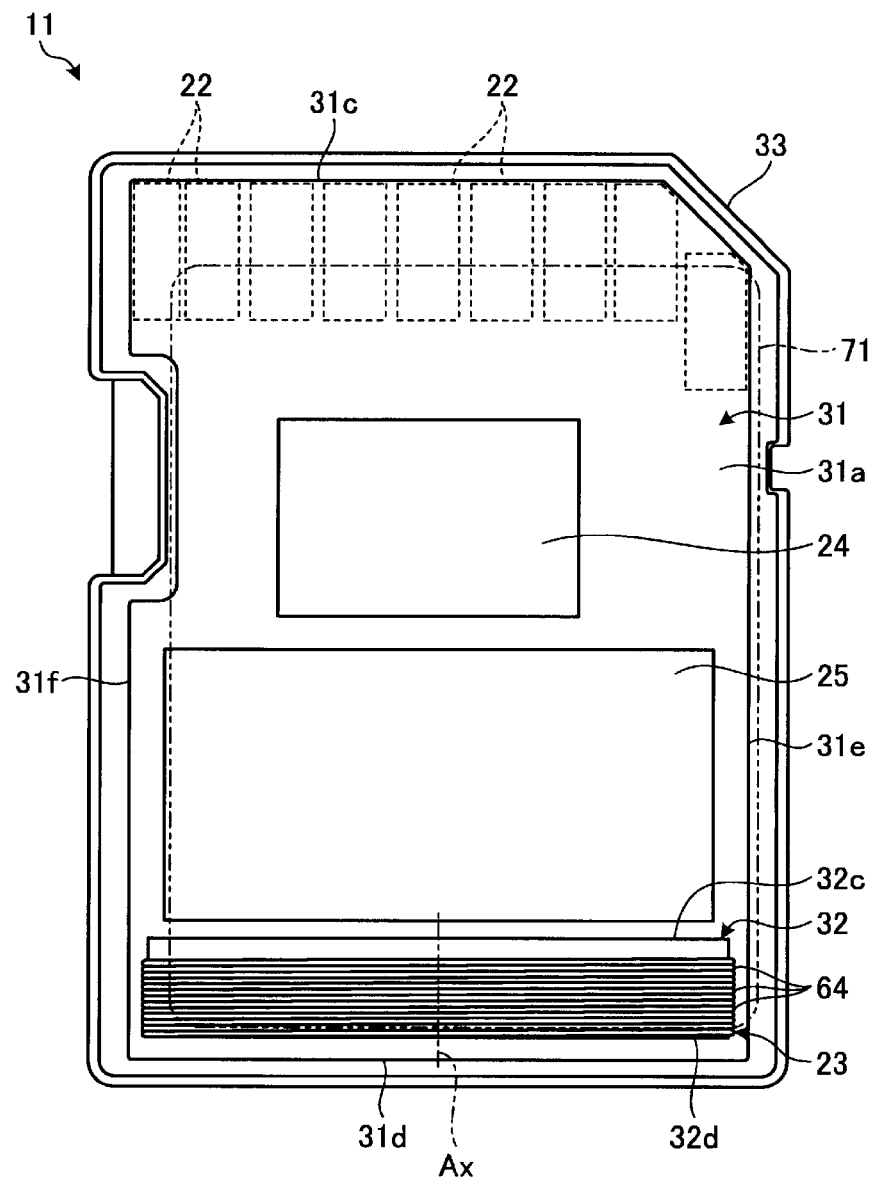
FIG. 10 is a plan view of a memory card according to a sixth embodiment.

Hereinafter, a sixth embodiment will be described with reference to FIG. 10. FIG. 10 is a plan view of the memory card 11 according to the sixth embodiment. As illustrated in FIG. 10, the memory card 11 according to the sixth embodiment is different from the first embodiment in that the wireless antenna 23 extends in the Y-axis direction, and dimensions of the wireless antenna 23 and the magnetic substance 32 are different from those in the first embodiment.

The center Ax of the wireless antenna 23 extends in the Y-axis direction. However, in the present embodiment, a length of the wireless antenna 23 in the Y-axis direction is shorter than a length of the wireless antenna 23 in the X-axis direction. In addition, a length of the magnetic substance 32 in the Y-axis direction is shorter than a length of the magnetic substance 32 in the X-axis direction.

In addition, in the same manner as the second embodiment, the distance between the first end portion 32c of the magnetic substance 32 and the wireless antenna 23 is longer than the distance between the second end portion 32d and the wireless antenna 23.

In the memory card 11 according to the sixth embodiment described above, the length of the wireless antenna 23 in the Y-axis direction is shorter than the length of the wireless antenna 23 in the X-axis direction. Accordingly, the diameter of the coil of the wireless antenna 23 is increased and it is possible to enlarge a range in which wireless communication can be performed by the wireless antenna 23.

Seventh Embodiment

Figure 11:
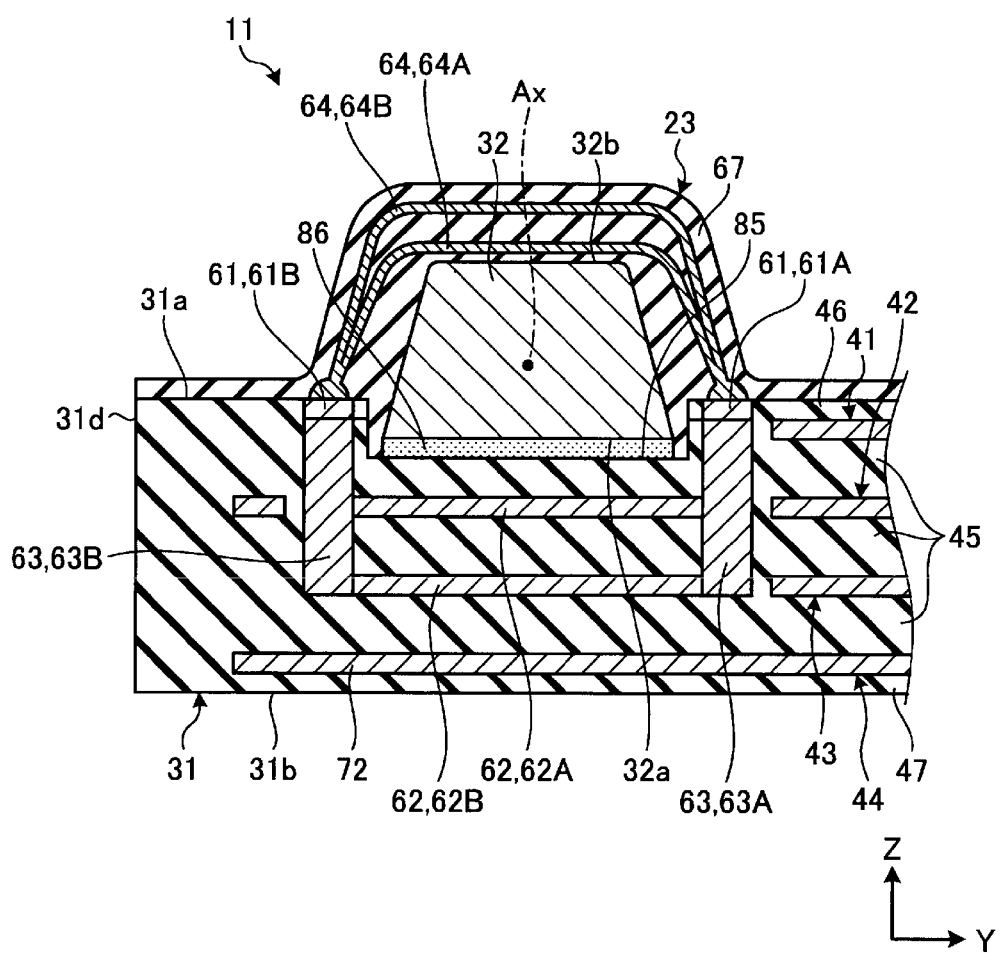
FIG. 11 is a cross-sectional view of a part of a memory card according to a seventh embodiment.

Hereinafter, a seventh embodiment will be described with reference to FIG. 11. FIG. 11 is a cross-sectional view of a part of the memory card 11 according to the seventh embodiment. As illustrated in FIG. 11, in the seventh embodiment, a recess portion 85 is provided on the first surface 31a of the first substrate 31. The recess portion 85 may also be referred to as a recess, a groove, or a mounting portion, for example.

The recess portion 85 is formed by removing some of layers of the first substrate 31, for example, the first conductive layer 41 and the insulating layer 45. The recess portion 85 extends in the X-axis direction. The magnetic substance 32 is disposed partly within the recess portion 85. The magnetic substance 32 is attached to a bottom of the recess portion 85 by, for example, an adhesive 86. It is noted that the magnetic substance 32 may be attached to the bottom of the recess portion 85 by the solder 53 in the same manner as the first embodiment.

In the memory card 11 according to the seventh embodiment described above, the recess portion 85 is provided on the first surface 31a and the magnetic substance 32 is disposed within the recess portion 85. Accordingly, the amount of increase in a thickness of the memory card 11 caused by the magnetic substance 32 is reduced. It is noted that the seventh embodiment can be applied to any of the first to sixth embodiments.

Eighth Embodiment

Figure 12:
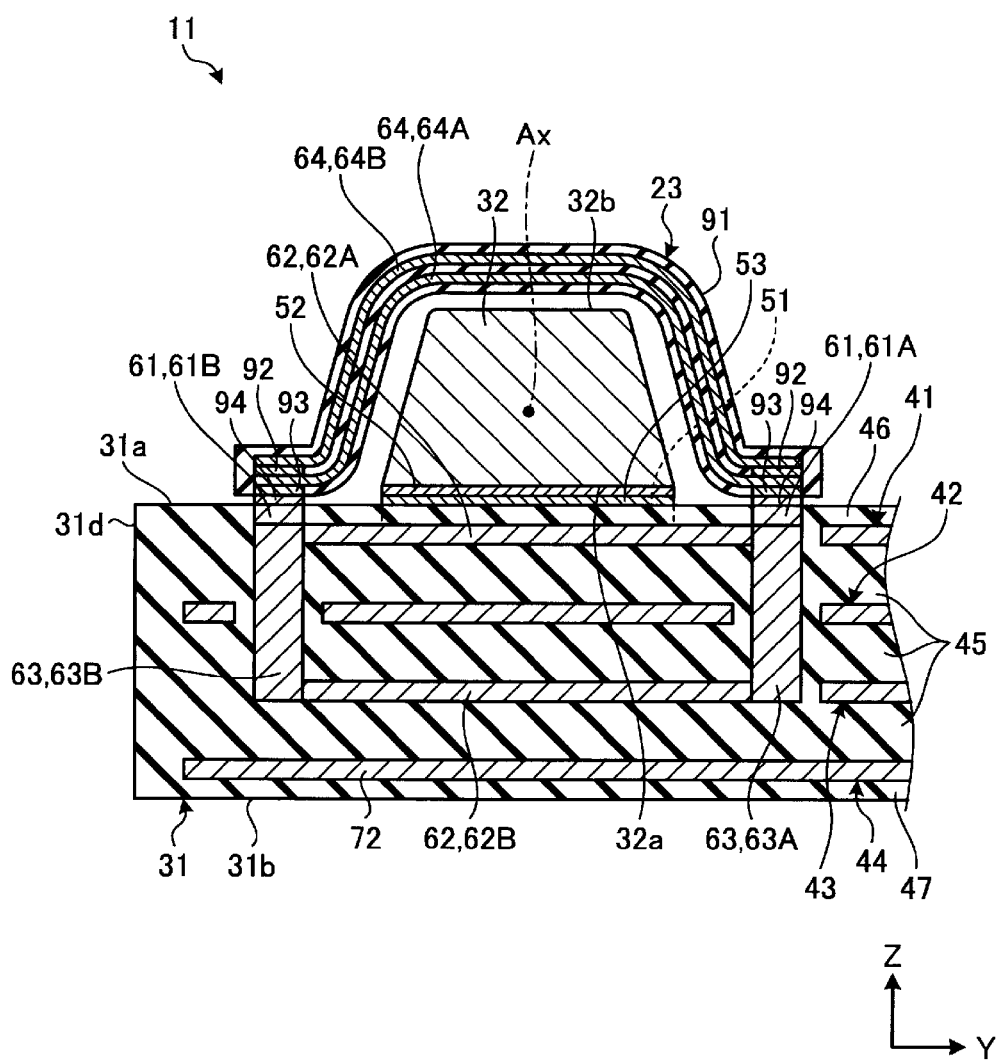
FIG. 12 is a cross-sectional view of a part of a memory card according to an eighth embodiment.

Hereinafter, an eighth embodiment will be described with reference to FIG. 12. FIG. 12 is a cross-sectional view of a part of the memory card 11 according to the eighth embodiment. As illustrated in FIG. 12, the memory card 11 according to the eighth embodiment includes a flexible printed circuit board (FPC) 91. The FPC 91 may also be referred to as a flexible cable, for example.

In the eighth embodiment, the plurality of outer wirings 64 are provided on the FPC 91. The outer wiring 64 is a wiring pattern provided on the FPC 91. The FPC 91 includes a plurality of layers. The outer wiring 64A and the outer wiring 64B are provided in different layers of the FPC 91.

The FPC 91 includes a plurality of vias 92 and a plurality of pads 93. The via 92 connects an end portion of the outer wiring 64A and an end portion of the outer wiring 64B with each other. The pad 93 is connected to an end portion of the outer wirings 64A, 64B through the via 92 and connected to the pad 61 by a solder 94. Accordingly, the plurality of outer wirings 64A, 64B are respectively connected to the plurality of inner wirings 62.

In the memory card 11 according to the eighth embodiment described above, the plurality of outer wirings 64 are provided on the FPC 91. Accordingly, it is possible to form the wireless antenna 23 by attaching the FPC 91 to the first substrate 31, so that it is possible to easily provide the wireless antenna 23. It is noted that the eighth embodiment can be applied to any of the first to seventh embodiments.

Ninth Embodiment

Figure 13:
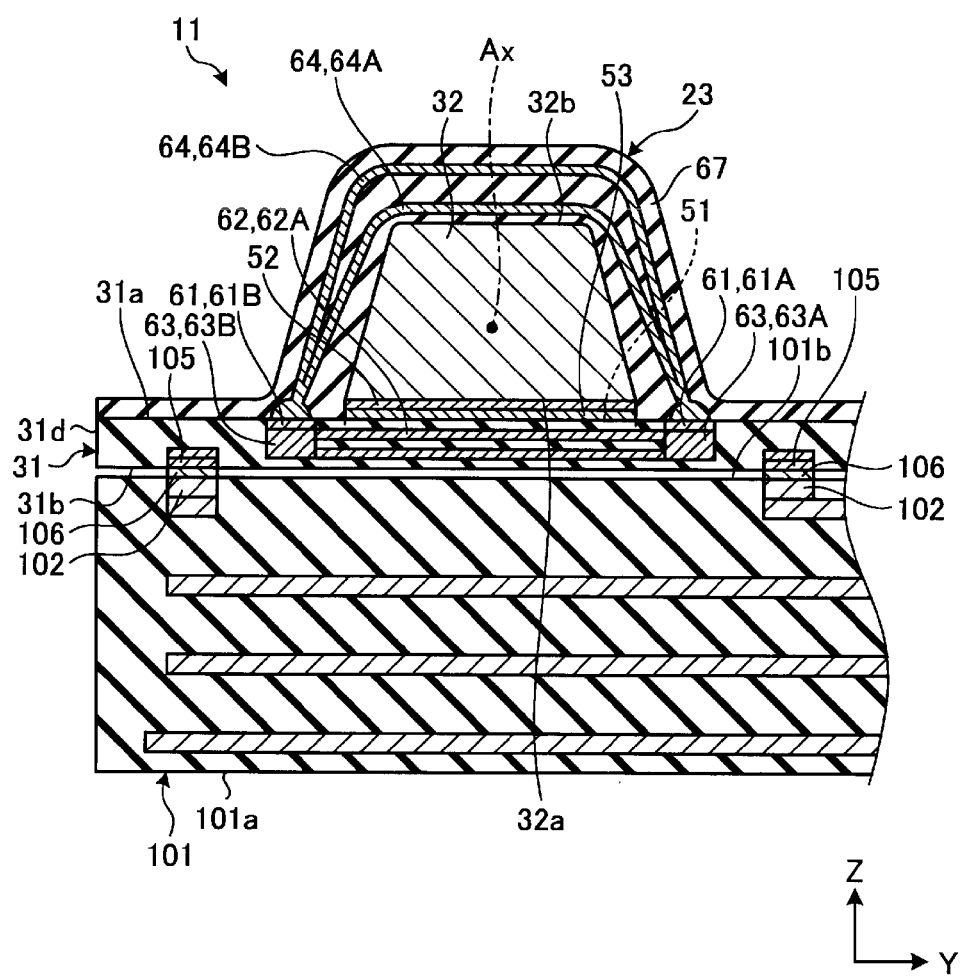
FIG. 13 is a cross-sectional view of a part of a memory card according to a ninth embodiment.

Hereinafter, a ninth embodiment will be described with reference to FIG. 13. FIG. 13 is a cross-sectional view of a part of the memory card 11 according to the ninth embodiment. As illustrated in FIG. 13, the memory card 11 further includes a second substrate 101.

The second substrate 101 is, for example, a PCB. The second substrate 101 has a third surface 101a and a fourth surface 101b. The third surface 101a is an approximately flat surface facing the negative direction of the Z-axis. The fourth surface 101b is located on an opposite side of the third surface 101a and is an approximately flat surface facing the positive direction of the Z-axis.

In the present embodiment, the I/F terminal 22 is provided on the third surface 101a of the second substrate 101. The controller 24 and the flash memory 25 are disposed on the fourth surface 101b of the second substrate 101. That is, the I/F terminal 22, the controller 24, and the flash memory 25 are provided on a substrate different from the first substrate 31.

A plurality of pads 102 are provided on the fourth surface 101b. The pad 102 is provided in a circuit provided on the second substrate 101 and is connected to, for example, the controller 24.

A plurality of pads 105 are provided on the second surface 31b of the first substrate 31. The pad 105 is connected to the wireless antenna 23. The pad 105 is connected to the pad 102 of the second substrate 101 by a solder 106. Accordingly, the first substrate 31 is attached to the second substrate 101 and the wireless antenna 23 is connected to a circuit of the second substrate 101. For example, the wireless antenna 23 is electrically connected to the controller 24.

In the memory card 11 according to the ninth embodiment described above, the second substrate 101 includes the third surface 101a which faces in an opposite direction of the positive direction of the Z-axis, and the I/F terminal 22 provided on the third surface 101a and capable of being electrically connected to the host device 12. The first substrate 31 is attached to the second substrate 101. Accordingly, since the first substrate 31, on which the wireless antenna 23 is provided, can be separately provided from the second substrate 101, on which the I/F terminal 22 is provided, it is possible to easily manufacture the memory card 11. It is noted that the ninth embodiment can be applied to any of the first to eighth embodiments. In addition, in the ninth embodiment, the first substrate 31 may be an FPC.

According to at least one of the embodiments described above, a loop antenna generates a magnetic field in a direction intersecting with a first direction which a first surface of a first substrate faces, so that even if a top of the first surface is covered with a metal such as a housing of a host device, the loop antenna can perform wireless communication with an external device. The loop antenna includes a plurality of first wirings provided in the first substrate, and a plurality of second wirings which are provided outside of the first substrate and which electrically connect one first wiring and with another first wiring. That is, since the first wiring provided on the first substrate can be used as a part of the loop antenna, the loop antenna can be easily provided without a special device such as a winding device which winds a wire. Accordingly, it is possible to reduce the cost of a semiconductor storage device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A semiconductor storage device comprising:
   a substrate having a first surface;
   a loop antenna that includes a plurality of electrodes on the first surface including first, second, third, fourth and fifth electrodes, first and second inner wirings provided in the substrate, and first and second outer wirings provided outside the substrate, the first outer wiring having a first end connected to the first electrode and a second end connected to the second electrode, the first inner wiring having a first end connected to the second electrode and a second end connected to the third electrode, the second outer wiring having a first end connected to the third electrode and a second end connected to the fourth electrode, and the second inner wiring having a first end connected to the fourth electrode and a second end connected to the fifth electrode; and
   a magnetic substance provided on the first surface and surrounded by the first and second inner wirings and the first and second outer wirings.

2. The semiconductor storage device according to claim 1, wherein
   the substrate has a second surface on an opposite side of the first surface, and four edges contiguous with the first and second surfaces, the four edges defining a rectangular shape and including first and second edges on opposing short sides of the rectangular shape and third and fourth edges on opposing long sides of the rectangular shape, and
   the loop antenna is closer to the second edge than to the first edge.

3. The semiconductor storage device according to claim 2, further comprising:
   a plurality of interface terminals connectable to an external device, provided on the second surface along the first edge.

4. The semiconductor storage device according to claim 3, wherein
   the first and third electrodes are aligned in a first direction that is parallel to the second edge, and the second and fourth electrodes are also aligned in the first direction, and
   a center axis of the loop antenna is parallel to the second edge.

5. The semiconductor storage device according to claim 3, wherein
   the first and third electrodes are aligned in a first direction that is parallel to the third edge, and the second and fourth electrodes are also aligned in the first direction, and
   a center axis of the loop antenna is parallel to the third edge.

6. The semiconductor storage device according to claim 5, wherein the first and third electrodes are separated from the second and fourth electrodes by a distance that is shorter than a length of the loop antenna in the first direction.

7. The semiconductor storage device according to claim 6, further comprising:
   a second loop antenna having the same structure as the loop antenna; and
   a second magnetic substance provided on the first surface and surrounded by first and second inner and outer wirings of the second loop antenna, wherein
   the loop antenna is located near the third edge of the substrate and the second loop antenna is located near the fourth edge of the substrate.

8. The semiconductor storage device according to claim 5, wherein the first and third electrodes are separated from the second and fourth electrodes by a distance that is greater than a length of the loop antenna in the first direction and is slightly less than a length of the second edge.

9. The semiconductor storage device according to claim 1, wherein
   the loop antenna includes a plurality of inner wirings, including the first and second inner wirings, and a plurality of outer wirings, including the first and second outer wirings, that extend along a substantial portion of the second edge, and
   the magnetic substance extends further along the second edge than the inner and outer wirings such that at least one of first and second ends of the magnetic substance are not surrounded by any of the inner and outer wirings.

10. The semiconductor storage device according to claim 9, wherein the first and second ends of the magnetic substance are bent so that the first end extends toward the first edge and the second end extends towards the second edge.

11. The semiconductor storage device according to claim 9, wherein the first and second ends of the magnetic substance are bent so as to extend toward the second edge.

12. The semiconductor storage device according to claim 9, wherein the first end of the magnetic substance is bent so that the first end extends toward the second edge, and a portion of the magnetic substance that extends toward the second edge is surrounded by a plurality of inner and outer wirings.

13. The semiconductor storage device according to claim 1, wherein the substrate has a recessed portion, and the magnetic substance is mounted within the recessed portion.

14. The semiconductor storage device according to claim 1, wherein the outer wirings are bonding wires.

15. The semiconductor storage device according to claim 1, wherein the outer wirings are wirings embedded in a flexible printed circuit board.

16. The semiconductor storage device according to claim 1, further comprising:
  one or more additional outer wirings electrically connected between the first and second electrodes in parallel with the first outer wiring; and
  one or more additional outer wirings electrically connected between the third and fourth electrodes in parallel with the second outer wiring.

17. The semiconductor storage device according to claim 1, further comprising:
  one or more additional inner wirings electrically connected between the second and third electrodes in parallel with the first inner wiring; and
  one or more additional inner wirings electrically connected between the fourth electrode and said fifth electrode in parallel with the second inner wiring.

18. A semiconductor storage device comprising:
  a first substrate having a first surface;
  a loop antenna that includes first, second and third electrodes on the first surface aligned in a first direction along a first line, fourth and fifth electrodes on the first surface also aligned in the first direction along a second line different from the first line, first and second inner wirings provided in the first substrate, and first and second outer wirings provided outside the first substrate, wherein the first outer wiring connects the first electrode to the fourth electrode, the first inner wiring connects the fourth electrode to the second electrode, the second outer wiring connects the second electrode to the fifth electrode, and the second inner wiring connects the fifth electrode to the third electrode; and
  a magnetic substance provided on the first surface and surrounded by the first and second inner wirings and the first and second outer wirings, wherein
  the first substrate has a second surface on an opposite side of the first surface, and four edges contiguous with the first and second surfaces, the four edges defining a rectangular shape and including first and second edges on opposing short sides of the rectangular shape and third and fourth edges on opposing long sides of the rectangular shape, and
  the loop antenna is located proximate to the second edge and distal to the first edge.

19. The semiconductor storage device according to claim 18, further comprising:
  a plurality of interface terminals connectable to an external device, provided on the second surface proximate to the first edge and distal to the second edge.

20. The semiconductor storage device according to claim 18, further comprising:
  a second substrate having a first surface on which the first substrate is mounted, the second substrate having a wiring layer to which the loop antenna is electrically connected; and
  a plurality of interface terminals connectable to an external device, provided on a second surface of the second substrate that is on an opposite side of the first surface of the second substrate.

* * * * *